US009336484B1

(12) United States Patent
Iverson

(10) Patent No.: US 9,336,484 B1
(45) Date of Patent: May 10, 2016

(54) SYSTEM AND METHOD FOR OUTLIER DETECTION VIA ESTIMATING CLUSTERS

(75) Inventor: David J. Iverson, Sunnyvale, CA (US)

(73) Assignee: The United States of America as Represented by the Administrator of the National Aeronautics and Space Administration (NASA), Washington, DC (US)

( * ) Notice: Subject to any disclaimer, the term of this patent is extended or adjusted under 35 U.S.C. 154(b) by 688 days.

(21) Appl. No.: 13/615,202

(22) Filed: Sep. 13, 2012

Related U.S. Application Data

(60) Provisional application No. 61/662,866, filed on Sep. 26, 2011.

(51) Int. Cl.

| | |
|---|---|
| *G06F 15/18* | (2006.01) |
| *G06N 5/00* | (2006.01) |
| *G06N 5/02* | (2006.01) |
| *G06F 17/30* | (2006.01) |
| *G06F 17/18* | (2006.01) |
| *G06N 3/08* | (2006.01) |
| *G06F 11/30* | (2006.01) |

(52) U.S. Cl.
CPC ............ *G06N 5/00* (2013.01); *G06F 17/30536* (2013.01); *G06F 17/30539* (2013.01); *G06N 5/02* (2013.01); *G06F 11/3003* (2013.01); *G06F 11/3006* (2013.01); *G06F 15/18* (2013.01); *G06F 17/18* (2013.01); *G06N 3/08* (2013.01)

(58) Field of Classification Search
CPC ... G06F 17/18; G06F 15/18; G06F 17/30286; G06F 11/3003; G06F 11/3006; G06N 5/00

USPC .................................................. 702/179–181
See application file for complete search history.

(56) References Cited

U.S. PATENT DOCUMENTS

| | | | | |
|---|---|---|---|---|
| 7,383,238 | B1 | 6/2008 | Iverson | |
| 7,797,130 | B1 * | 9/2010 | Silberg | G06F 17/18 700/108 |
| 7,889,914 | B2 * | 2/2011 | Regli | G06N 99/005 382/159 |
| 2012/0041575 | A1 * | 2/2012 | Maeda | G05B 23/024 700/80 |
| 2014/0156223 | A1 * | 6/2014 | Toomre | G06K 9/0014 702/179 |

* cited by examiner

*Primary Examiner* — John Breene
*Assistant Examiner* — Lynda Dinh
(74) *Attorney, Agent, or Firm* — Christopher J. Menke; Robert M. Padilla; John F. Schipper

(57) ABSTRACT

An efficient method and system for real-time or offline analysis of multivariate sensor data for use in anomaly detection, fault detection, and system health monitoring is provided. Models automatically derived from training data, typically nominal system data acquired from sensors in normally operating conditions or from detailed simulations, are used to identify unusual, out of family data samples (outliers) that indicate possible system failure or degradation. Outliers are determined through analyzing a degree of deviation of current system behavior from the models formed from the nominal system data. The deviation of current system behavior is presented as an easy to interpret numerical score along with a measure of the relative contribution of each system parameter to any off-nominal deviation. The techniques described herein may also be used to "clean" the training data.

18 Claims, 12 Drawing Sheets

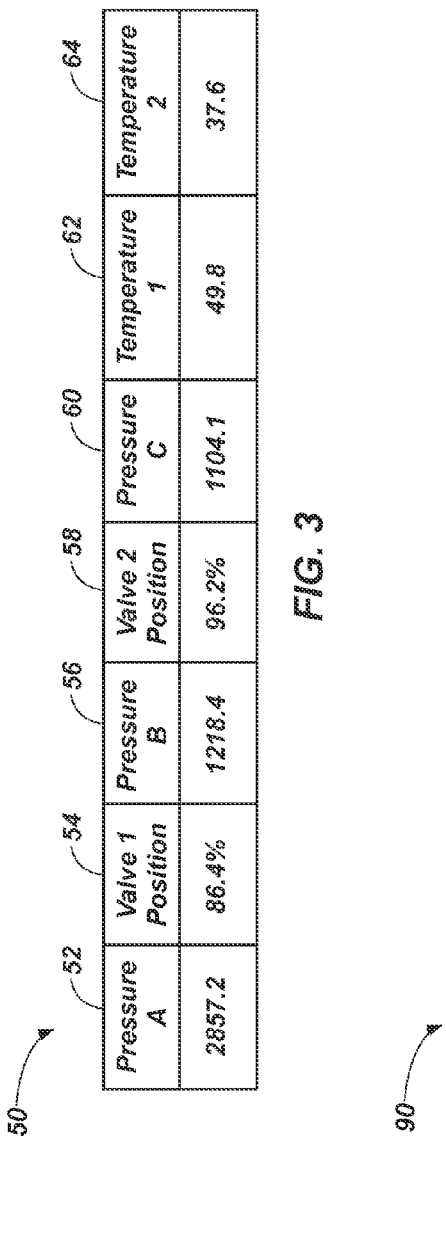
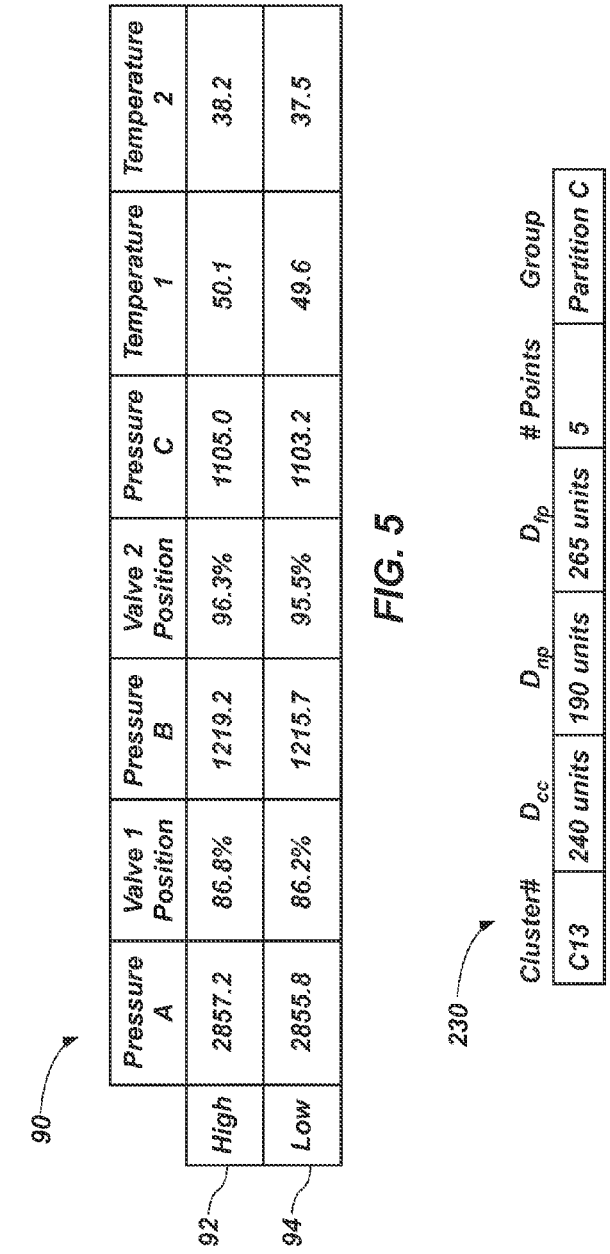
FIG. 3
FIG. 5
FIG. 12

SYSTEM AND METHOD FOR OUTLIER DETECTION VIA ESTIMATING CLUSTERS

This patent application claims the benefit of U.S. Provisional Patent Application No. 61/662,866, filed Sep. 26, 2011, which is incorporated by reference in its entirety herein.

ORIGIN OF INVENTION

The invention described herein was made by employees of the United States Government and may be manufactured and used by or for the Government of the United States of America for governmental purposes without the payment of any royalties thereon or therefor.

BACKGROUND OF INVENTION

1. Technical Field of the Invention

This invention relates generally to the field of automated system and anomaly detection and, in particular, to methods of generating system monitoring knowledge bases from nominal system behavior, and to the use of these knowledge bases in monitoring system performance in real-time or near-real time.

2. Description of Related Art

The modern information age provides great quantities of raw data concerning the performance of man-made engineered systems as well as data concerning the behavior of natural systems. Numerous information processing techniques have been employed to attempt to classify such data, look for anomalies, or otherwise assist humans to extract, understand and/or respond to information contained in the data. Examples of such techniques include model based reasoning, machine learning, neural networks, data mining, support vector machines, and various decision tree models including ID3 decision tree learner, among many others. However, these techniques typically have one or more drawbacks that render them unsuitable or disfavored for some applications.

For example, model based reasoning and related techniques typically require a detailed engineering simulation of the system under study, often including expert knowledge of system behavior, detailed behavior of system components and subsystems, and detailed knowledge of interactions among system components and failure mechanisms, among other things. Such knowledge may not be available for all components and subsystems. Furthermore, even when a reasonably accurate system simulation is available, it often requires impractical amounts of computer resources. That is, the simulation may execute too slowly to provide information in real-time or near-real time so as to be unsuitable for many practical system monitoring applications. In addition, the computer resources may not be available in space-limited or weight-limited environments such as space vehicles. Thus, a need exists in the art for computationally rapid techniques to monitor the performance of a system and detect anomalous behavior without the need for excessive computer resources.

Some classification or decision models require that the system be trained with data that include data derived from both normally-functioning systems (nominal data) as well as data derived from anomalous system behavior (off-nominal data). In many practical applications, off-nominal data are unavailable for training, and even the nominal data available for training may not fully explore all of the system's nominal operating regimes. Thus, a further need exists in the art for techniques to monitor a system's performance that does not require off-nominal data for training.

U.S. Pat. No. 7,383,238, which issued on Jun. 3, 2008, and has a common inventor and assignee as this invention, discloses an attempt to overcome some of the shortcomings identified above. In particular, the '238 patent discloses a learning algorithm that automatically extracts system models from archived system data. The '238 patent further discloses using the system models to find outlier data points. However, despite its improvement over the prior art, the techniques disclosed in the '238 patent are still lacking due to the fact that they only utilize the single best matching data point to determine an outlier. The use of a single best matching data point may be problematic where the single best matching data point is itself an outlier. It would be a significant improvement over the teachings of the '238 patent to utilize multiple data samples in a model rather than just the single best matching data point to reduce the possibility that an off nominal data point will go undetected because of a similar off nominal data point in the training data. The '238 patent is hereby incorporated by reference in its entirety as if fully set forth herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

SUMMARY OF THE INVENTION

Accordingly and advantageously, the present invention relates to a system, method, and software implementations for building one or more system monitoring knowledge bases that are subsequently used to monitor a system's performance. The system, method, and software implementations disclosed herein analyze nominal system data and form classes or clusters of expected system sensor values, sometimes referred to herein as cluster modeling data. These clusters are used in building a system monitoring knowledge base.

In an embodiment of the present disclosure, the clusters in the monitoring knowledge base are grouped according to their distances from an indexing reference point. In particular, those clusters having distances from the indexing reference point that fall within one of a plurality of predetermined partitions are grouped together. In an embodiment of the present disclosure, the number of training points in each cluster is included in the monitoring knowledge base.

Monitoring knowledge bases can be constructed entirely from several sets of nominal sensor data, either gathered directly from the sensors of the system to be monitored during actual operation, or gathered from system simulations, or both. Thus, among the advantages of the present invention is that off-nominal data are not needed to train the system. Further advantages of the present invention include avoiding the complexity and expense of constructing a detailed system model that may require many hours of expert time to create and/or significant computer resources to run.

When a query point is received, the system, method, and software implementations of the present invention generate a list or group of closest clusters in the knowledge base that is closest to the query point. To ensure that the query point is not compared to an off-nominal data point, the aggregate number of training points in the list or group of closet clusters must meet a user-defined threshold value. Once the list or group of closest clusters to the query point is determined, and the aggregate number of training points in the list or group of closest clusters meets or exceeds the user defined threshold values, the distance between the query point and each of the clusters in the list or group is determined. These individual distances may then be weighted by the number of points in the relevant cluster. This ensures that clusters with more training points are more heavily weighted than clusters with fewer training points. A single summary distance value may then be generated by combining the weighted distance values between the query point and each of the clusters.

In an illustrative embodiment of the present disclosure, the summary distance value may then be standardized to allow the results to be expressed relative to common statistical measures, such as standard deviation. For example, standardization may be done by calculating the standard deviation, or another statistical measure, of all of the training points from their N nearest neighbor points. The standard deviation may then be utilized to normalize the summary distance value. In this manner, the present invention provides the ability to analyze the knowledge base to determine the statistical distribution of the training points used to construct the model. The standardization of the summary distance value allows the results to be more consistent across systems and easier to interpret than previous results, which were previously not standardized.

In an illustrative embodiment of the present disclosure, the uniqueness of a multivariate data set, i.e., query point, from its N nearest neighbor points can be determined using the system, method, and software implementations of the present invention. Larger distances indicate that a query point is more unusual than others in the data set. In an illustrative embodiment of the present disclosure, every incoming query point is assigned a standardized deviation score.

If the incoming query point's standardized deviation score is sufficiently close to expected values, the system is deemed to be functioning normally since it is sufficiently close to previous normal behavior. "Sufficiently close" is determined by threshold parameters supplied by the user to take into account that training data will not generally span the entire space of normal system operation, and the sensor data from nominally operating systems are inherently subject to a level of "noise," causing deviations in data received from sensors even for identically-operating systems.

An illustrative embodiment of the present disclosure may also determine a measure of the relative contribution of each individual parameter of a query point to its standardized deviation score, which can be useful for fault isolation and diagnosis.

These and other advantages are achieved in accordance with various embodiments of the present invention as described in detail below.

BRIEF DESCRIPTION OF THE DRAWINGS

The features and advantages of the disclosure will become apparent from a consideration of the subsequent detailed description presented in connection with the accompanying drawings in which:

FIG. 3 depicts an exemplary data vector as used by the inductive monitoring system of FIG. 1.

FIG. 5 depicts an exemplary cluster having a pair of data vectors showing maximum and minimum values for the parameters.

FIG. 12 depicts exemplary cluster modeling data determined using the technique described in FIG. 10.

DETAILED DESCRIPTION

Figure 1:
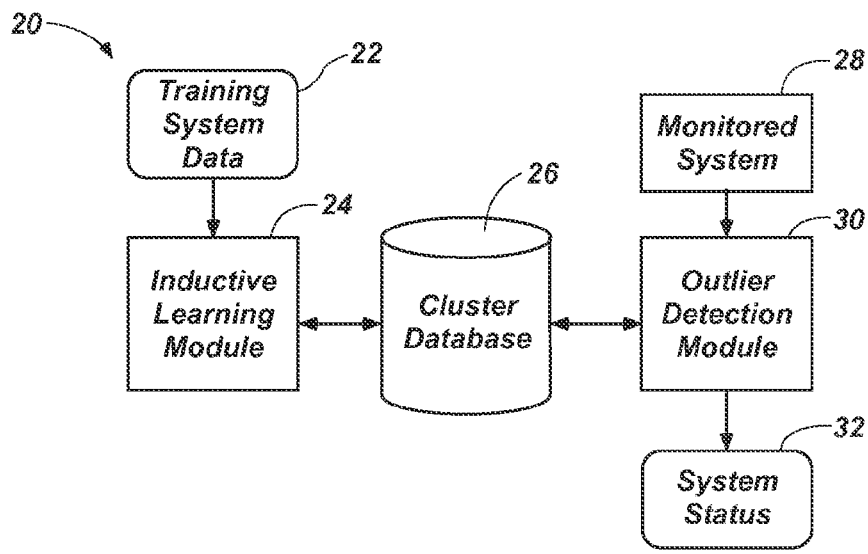
FIG. 1 depicts a high-level block diagram of an inductive monitoring system pursuant to an illustrative embodiment of the present disclosure.

For the purposes of promoting an understanding of the principles in accordance with the disclosure, reference will now be made to the embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. As used herein, the terms "comprising," "including," "having," "containing," "characterized by," and grammatical equivalents thereof are inclusive or open-ended terms that do not exclude additional, unrecited elements or method steps.

Many of the functional units described in this specification have been labeled as "modules" to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be implemented by a processor coupled to a memory, the memory containing computer-readable instructions, that when executed by a processor, cause the processor to perform the identified tasks. A module may include multiple processors and multiple memories, that when grouped together, perform the identified tasks.

Modules are also implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Referring now to FIG. 1, there is depicted a high-level block diagram of an environment 20 suitable for a typical implementation of the present disclosure. A set of training data 22 is obtained from actual system sensors or simulated system performance. Nominal operating regions (or "clusters") are extracted from the training data, typically operating through an inductive learning module 24, and stored in a system monitoring knowledge base, or cluster database 26 residing on an electronic storage medium, e.g., a high capacity hard drive. As data are acquired from sensors on an actual, operating, system, that is, monitored system data, 28, an outlier detection module 30 compares the data acquired from monitored system 28 with the clusters of the cluster database 26 to determine the monitored system's performance or status 32. Thus, it will be appreciated that the present disclosure learns system behavior and stores that knowledge in a database, which is compared with data from actual operating systems to monitor that system's performance or "health."

Figure 2:
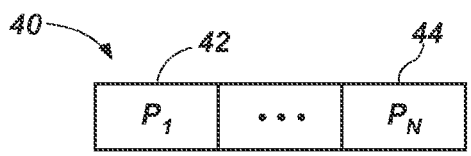
FIG. 2 depicts a diagram of a typical data vector used by the inductive monitoring system of FIG. 1.

FIG. 2 depicts a vector 40 or data vector or a query point or a training point. The data vector 40 is the basic data structure of the present disclosure and comprises a set of N parameter values, $P_1$ 42 to $P_N$ 44. Each vector 40 is an ordered list of data parameters 42-44 (also referred to as vector elements or members). The data parameter values 42-44 are collected from the training system or the monitored system by a data acquisition process, or produced by means of a system simulation. In another embodiment, the vector 40 can contain derived parameter values computed from the collected data parameter values and/or parameter values derived from data acquired at different times (from different data "frames"). The values used in a given data vector may be collected simultaneously by the data acquisition system, or collected over a period of time. The user specifies the size and contents of the vector structure appropriate for the monitoring application. For example, the vector 40 may contain values produced by sensors over time, e.g., a calculation of the rate of change of a sensor over time, or the difference between two sensor values taken at different times. The values in the vector 40 may be scaled and normalized as is known to one having ordinary skill in the art.

FIG. 3 depicts an exemplary data vector 50. The name of each data parameter is shown above its value. For example, data parameter 52, Pressure A, has a value of 2857.2. The names of the other data parameters are Valve 1 Position 54, Pressure B 56, Valve 2 Position 58, Pressure C 60, Temperature 1 62, and Temperature 2 64. These data may be acquired from sensors.

The present disclosure may be advantageously used for those cases in which it is particularly difficult to construct detailed system diagnostic models of the system (or some components thereof) due to the complexity or unavailability of design information. The system monitoring knowledge bases, or cluster databases, can be constructed entirely from several sets of nominal sensor data, either gathered directly from the sensors of the system to be monitored during actual operation, or gathered from system simulations, or both. The system analyzes the nominal system data and forms classes, or clusters, of expected system sensor values. These classes, or clusters, are used to build a system monitoring knowledge base. It will be appreciated that the data used to construct classes of expected sensor values and the system knowledge database are called "training data" whether obtained from actual system operation, simulations, or both.

Figure 4:
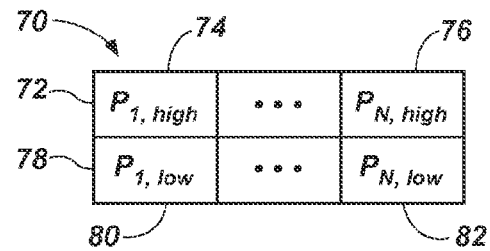
FIG. 4 depicts a diagram of a typical cluster of the cluster database of FIG. 1.

FIG. 4 depicts a typical cluster 70. The present disclosure "learns" the operating characteristics of the system by processing training data sets containing nominal system data collected either from the monitored system itself or from an accurate simulation of the system, or both. The learning module 24 (FIG. 1) processes the training data by formatting the data into the predefined vector format and building a knowledge base containing clusters of related value ranges for the vector parameters. In some embodiments of the present invention, each cluster defines a range of allowable values for each parameter in a given vector. In cluster 70, a first cluster vector 72 comprises the values of the upper limit, that is, a high value, for the parameters, $P_{1,high}$ to $P_{N,high}$, 74 to 76, respectively; and a second cluster vector 78 comprises the lower limit, that is, a low value, for the parameters $P_{1,low}$ to $P_{N,low}$, 80 to 82, respectively. In one embodiment, a cluster defines a range of values for a subset of the parameters of a vector. Alternately, a cluster defines a range of values for each parameter of a vector.

During system monitoring, the parameter values collected from the monitored system for a given vector are compared to the values of the clusters in the cluster database. If the clusters were generated from nominal data and if all the values of a vector from the monitored system fall within or near the parameter ranges defined by several of these clusters, that vector is deemed to contain nominal data.

FIG. 5 depicts an exemplary cluster 90 for the parameters of the vector of FIG. 3. The name of each parameter is shown above the values. The first cluster vector 92 comprises the high values or upper limits for respective parameters. The second cluster vector 94 comprises the low values or lower limits for respective parameters. Each data vector can be considered a point in N-dimensional space where N is the number of parameters in the vector. As used herein, the term "vector" and "point" may be used interchangeably.

As described above, a cluster defines an interval, that is, a range of possible values for the parameters in a vector. A vector representing a point contained in a cluster will contain a value for each parameter within the range specified in the cluster for the corresponding parameter. In some embodiments of the present disclosure, the high and low values for each parameter in the vectors in a cluster can be thought of as points that define the corners of an N-dimensional "minimum bounding rectangle." All points contained in a cluster may be contained inside or on an edge of that rectangle. FIG. 5 depicts an exemplary cluster showing minimum and maximum parameter values for the parameters of the vector of FIG. 3.

Figure 6:
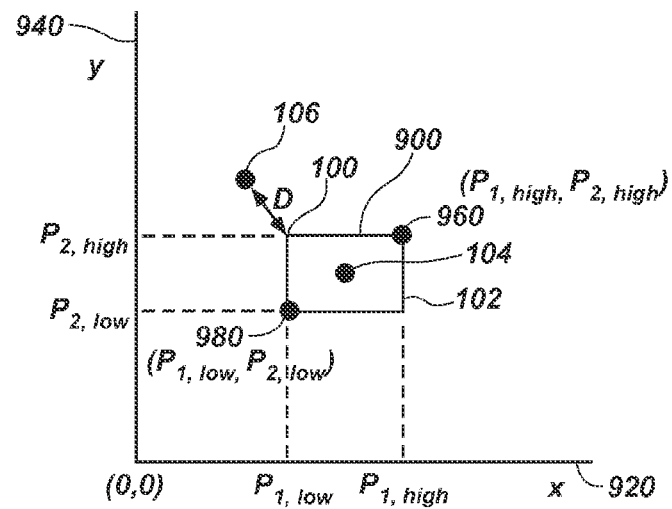
FIG. 6 depicts an example of a two-dimensional minimum bounding rectangle for an exemplary cluster.

FIG. 6 depicts an example of a two-dimensional minimum bounding rectangle 900 for an exemplary cluster. The cluster has two parameters, first and second parameters, $P_1$ and $P_2$, respectively. The first parameter $P_1$ is plotted on the x-axis 920. The second parameter $P_2$ is plotted on the y-axis 940. A first cluster vector, that defines the upper limits, contains parameter values ($P_{1,high}$, $P_{2,high}$) and forms an upper corner 960 of the minimum bounding rectangle 900. A second cluster vector, that defines the lower limits, contains parameter values ($P_{1,low}$, $P_{2,low}$) and forms a lower corner 980 of the minimum bounding rectangle 90. The other corners, 100 and 102, of the minimum bounding rectangle 900 are defined by the ($P_{1,low}$, $P_{2,high}$) and ($P_{1,high}$, $P_{2,low}$) respectively.

Figure 7:
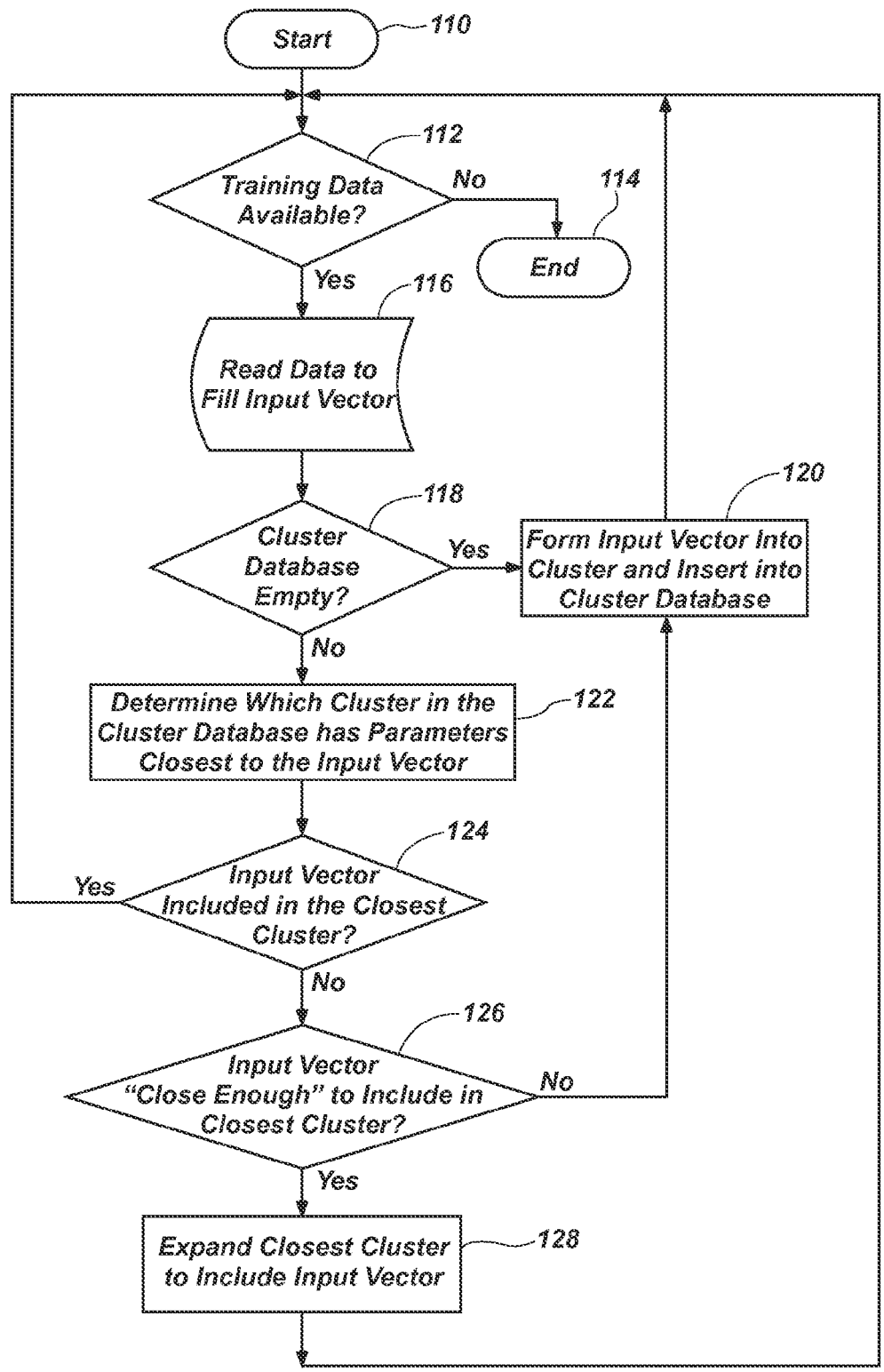
FIG. 7 depicts a flowchart of an illustrative embodiment of a technique to generate a cluster database by the inductive learning module of FIG. 1.

FIG. 7 depicts a flowchart of an embodiment of the generation of a cluster database by the inductive learning module 24 of FIG. 1. In step 110, the inductive learning module 24 typically begins the training process with an empty cluster database. In step 112, the inductive learning module 24 determines if any training data are available. If not, in step 114, the process ends. If, in step 112, the inductive learning module 24 determines that training data are available, in step 116, the inductive learning module reads the training data and formats the training data into an input vector. Alternately the inductive learning module 24 receives real-time training data. In step 118, the inductive learning module determines if the cluster database is empty. If so, in step 120, the inductive learning module 24 forms a cluster based on the values of the input vector, inserts the cluster into the cluster database, and proceeds to step 112. In one illustrative embodiment, to form the cluster, the inductive learning module 24 adds predetermined high initialization values to respective parameter values of the input vector to form a high value for each parameter of the cluster, and subtracts predetermined low initialization values from respective parameters of the input vector to form a low value for each parameter of the cluster. When a new cluster is formed from a single input vector, it is frequently advantageous to expand the parameter values of the input vector to accommodate for data uncertainty and/or to provide for a more general initial cluster definition.

If, in step 118, the inductive learning module 24 determines that the cluster database is not empty, in step 122, the inductive learning module 24 determines which cluster in the cluster database has parameter values closest to the input vector. "Closest" is defined in terms of a defined "distance" between the input vector and the cluster. To determine the distance, a variety of definitions for a distance metric can be used. In one embodiment, the standard Euclidean distance metric determines a distance D between the input vector and a selected point in the cluster as follows in Eq. 1:

$$D(X, Y) = \sqrt{\sum_i (X_i - Y_i)^2} \quad \text{Eq. 1}$$

The distance metric, whether defined by Eq. 1 or an alternative, typically determines the distance between two vectors or points in the N dimensional space. Since a cluster will generally contain more than one vector, determining the distance from a vector to a cluster involves generalizing the application of a distance metric to accommodate a multi-vector cluster. Several procedures can be used. A cluster reference point within the cluster can be selected and all "distances to the cluster" defined to be the distance to the cluster reference point. A centroid value can be computed for each parameter of the vectors in the cluster and this centroid point used as the cluster reference point. Other weighted averages of the parameter values or mean parameter values of each vector in the cluster can also be used to determine a cluster reference point.

The concept of "distance to a cluster" is not restricted to the use of a single cluster reference point with "distance" determined according to a distance metric from the input vector to the reference point. The goal of such a calculation is to provide a quantitative measure of "nearness" of the input vector to various clusters in the database such that, in generating the cluster database, the input vector can be assigned to an existing cluster or used to initiate another cluster. For system monitoring, the "nearness" definition should be capable of distinguishing normal from anomalous system behavior. These criteria can be fulfilled by a "distance" concept involving several vectors of the cluster as well as the use of a "distance" to a single exemplary cluster reference point.

For example, in some embodiments of the present invention, the parameter values of the input vector are compared to the upper and lower parameter values of the vectors of the cluster and the differences are summed (in some embodiments, taking account of algebraic signs of the differences to account for input vectors lying within a previously-determined cluster). Such a multi-vector "distance" concept is used in the example of the Hybrid Combustion Facility described herein.

Using the Euclidian distance metric of Eq. 1, the parameter values of the input vector are represented by $X_i$ and the respective parameter values of the cluster reference point are represented by $Y_i$. The cluster reference point can be selected in a variety of ways. For example, in one illustrative embodiment, the cluster reference point is taken to be the cluster centroid, which is defined as the average of the high and low values for each parameter in the vectors contained in the cluster. Referring to FIG. 6, point 104 represents the centroid. In another embodiment, the cluster reference point is defined as the cluster mean vector constructed using the mean value of every parameter contained in the cluster. Yet another embodiment defines a cluster reference point as that vector in the cluster having parameter values as close as possible to each corresponding parameter value in the input vector. Using this embodiment, in FIG. 6, point 100 is the closest point in the cluster to the input vector 106, and the distance D is determined between points 100 and 106 using the Euclidian distance formula above. Based on the distance from the input vector to the cluster reference point, D, the inductive learning module 24 selects the cluster with the shortest distance D to the input vector as the closest cluster.

Other techniques can also be used for selecting the cluster reference point. Different choices for cluster references points can affect the performance by altering the parameter tolerances in individual clusters and the number of clusters in the final knowledge base. For example, determining the distance between a vector and the closest point in a cluster rather than the centroid would typically result in shorter distances and be likely to incorporate more training vectors into fewer clusters rather than create a larger number of distinct clusters. Conversely, determining distance from the input vector to the furthest point in the cluster would be likely to result in a larger number of smaller clusters in the database. Smaller clusters (i.e., a smaller distance between upper and lower bounds) would typically provide tighter monitoring tolerances, which may not be desirable on systems with low accuracy or noisy sensors. Also, larger numbers of clusters in the database could increase the search time to identify the "nearest" cluster to an input vector, which may be disadvantageous for monitoring a system with a high data rate or monitoring with a slower computer. A balancing of database size with monitoring tolerance for the particular application is typically desirable.

After determining the cluster that is closest to the input vector, in step 124, the inductive learning module 24 determines if the input vector is contained within the closest cluster of step 122. If so, the inductive learning module proceeds to step 112.

If, in step 124, the inductive learning module determines that the input vector is not contained within the closest cluster, in step 126, the inductive learning module determines whether the parameter values of the input vector are close enough to include that input vector in the closest cluster. A "cluster-expansion-distance threshold value," which is specified by a user, defines a maximum distance between the input vector and the closest cluster such that the input vector will be incorporated into the cluster. If the distance from the input vector to the closest cluster, determined above, is not greater than the specified cluster-expansion-distance threshold value, in step 128, the inductive learning module 24 expands the closest cluster to include the input vector. In other words, the cluster parameter ranges are expanded to include the input vector in the cluster, thereby redefining the extent of the closest cluster. Step 128 proceeds to step 112.

In another illustrative embodiment of step 128, the cluster parameter ranges are expanded more than the minimum values that would include the input vector in the cluster. Such super-minimum parameter expansion is a useful procedure for allowing for uncertainty in the data measurements and/or to further generalize the training examples. The desired expansion factors can also be specified by the user. For example, the range for each updated parameter in the cluster can be expanded by the difference between the value of the parameter in the input vector and the nearest value to the input vector, plus a percentage of that value. A 2% expansion factor is adequate in many cases, particularly in cases with fairly focused clusters. One could also expand by a percentage of the difference between the parameter in the input vector and the cluster centroid. In addition, one could use an expansion factor to compensate in an approximate way for the estimated accuracy of the particular sensor generating the parameter. That is, if a sensor is known to be accurate to approximately 5%, one can add or subtract 5% for the value of that parameter in the vector. Other correction procedures can also be applied depending on the particular characteristics of the system under study and the monitoring application.

If, in step 126, the inductive learning module 24 determines that the parameter values of the input vector are not sufficiently close to include the input vector in the cluster, the inductive learning module 24 proceeds to step 120 to form the input vector into a new cluster. In other words, if the distance between the input vector and the closest cluster is greater than the cluster-expansion-distance threshold value (possibly including any expansion factors), a new cluster is generated based on the input vector.

It is often advantageous to scale or normalize the data values before they are inserted into the vectors. Arbitrary choices for units of measurement can cause some data values to be represented by large numbers while other data values are represented by small numbers, tending to skew calculations by over-weighting the large numbers. This is frequently undesirable and can be ameliorated or avoided by normalizing data values. Several normalization procedures can be employed.

Figure 8:
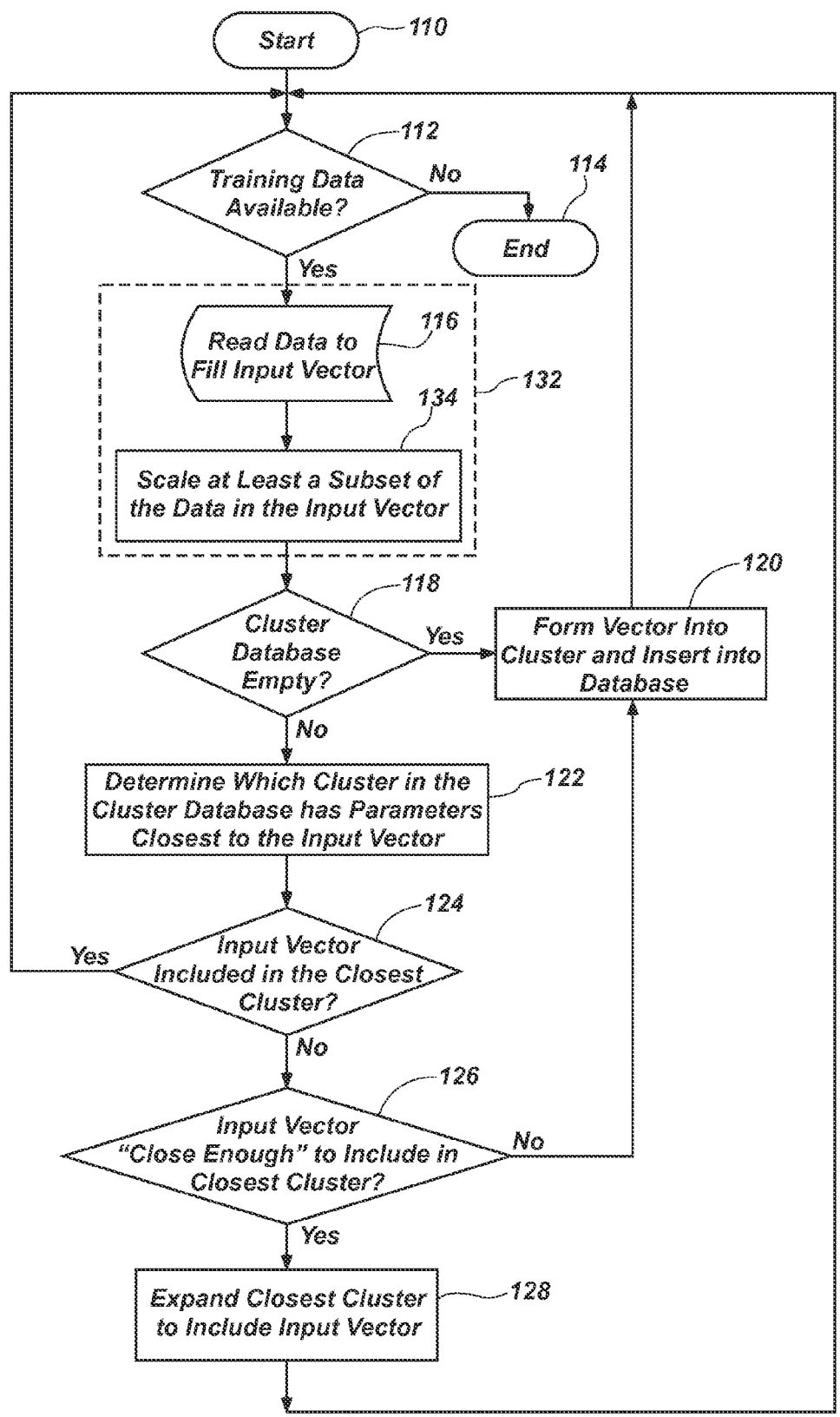
FIG. 8 depicts a flowchart of an illustrative embodiment of another technique to generate a cluster database that scales or normalizes at least a subset of the input parameter values of the input vector of the inductive learning module of FIG. 1.

FIG. 8 depicts a flowchart of an illustrative embodiment of the inductive learning module 24 that scales or normalizes at least a subset of the input parameter values of the input vector. FIG. 8 is the same as FIG. 7 except for block 132; therefore the differences will be described. Step 116 reads the data to fill an input vector. In step 134, the inductive learning module 24 scales at least a subset of the input data of the input vector. In another embodiment, represented by block 132, steps 116 and 134 are combined to scale the input data as they are read and before they are stored in the input vector.

For example, in one embodiment, each parameter is scaled to represent a percentage (or fraction) of a maximum range for that parameter, thereby causing every data value, $d_i$, of the vector to lie in the range between 0 and 100.0, or between 0 and 1.00. This normalization procedure can be used to give the user a more intuitive understanding of the monitoring knowledge database and the significance of any off-nominal system behavior encountered during system monitoring.

In another embodiment, to scale the data, parameter values are weighted in comparison to other parameters, rather than being normalized to provide each parameter with substantially equal weight. For example, scaling a parameter to have a larger possible range relative to other parameters in the vector will tend to amplify any deviations in that parameter.

In addition to those described herein, other combinations of data normalization and distance metrics may be useful for various situations and can be empirically determined with typical training data and, in some embodiments, assumed off-nominal system data. It will be appreciated that an evaluated query point may be scaled or normalized prior to evaluation in the same manner as the training data.

After all of the training data have been processed, the result is a database of clusters model data (the system monitoring knowledge base) that characterizes system performance in the operating regimes covered by the training data. Each cluster defines one set of constraints on the values allowed for each parameter in any particular monitoring input vector. If there is no cluster in the monitoring knowledge base that contains a given input vector or is "near" that input vector, then the system may be behaving in an unexpected manner indicating a possible system anomaly.

In another illustrative embodiment, the outlier detection module 30 (FIG. 1) that monitors a system by comparing incoming data with the clusters in the cluster or knowledge database to determine the "distance" (defined below) from the incoming sensor data to the nearest knowledge base clusters. If the incoming sensor data lie sufficiently close to clusters of the knowledge base derived from nominal system performance, the system is deemed to be functioning normally since it is sufficiently close to previous normal behavior. "Sufficiently close" is determined by threshold parameters supplied by the user to take into account that training data will not generally span the entire space of normal system operation, and the sensor data from nominally operating systems are inherently subject to a level of "noise," causing deviations in data received from sensors even for identically operating systems.

An important function of the outlier detection module 30 is to monitor system health, and the outlier detection module is not primarily intended to provide thorough system diagnostic information for off-nominal performance. However, some diagnostic information is available that can, in some circumstances, provide useful guidance. For example, the amount by which off-nominal data fail to meet the required threshold criteria (that is, the "distance" from the nearest cluster) can provide information as to the severity of the anomalous performance. In addition, the particular cluster closest to the suspicious system data can also provide useful guidance as to the possible nature of the anomalous performance (and/or exclude certain types of system malfunctions).

If the outlier detection module 30 detects off-nominal system performance, it can respond in at least one or more of the following ways: (a) Alert the operator to the suspicious data, (b) Activate system diagnostic procedures and/or software, (c) Alter the mode of system operation in response to the suspicious data including initiating emergency shut-down, or (d) Determine the degree of "off-nominal" behavior and/or the nearest class defining nominal performance. Select one or more responses based on the results of this determination.

Automatic system health monitoring can significantly benefit from an accurate characterization or model of expected system behavior, that is, "nominal" behavior. Among the advantages of the present invention is the avoidance of difficulties often encountered in producing detailed health monitoring and/or diagnostic models of some systems and/or components, typically arising from the complexity and/or the unavailability of design information. Many current health monitoring schemes simply monitor system parameters one-by-one to ensure they do not exceed predetermined extreme thresholds. Such monitoring systems may not be able to detect early signs of anomalous behavior not involving the beyond-threshold excursion of any one parameter.

Some monitoring systems utilize an "expert" knowledge base or a detailed system model to provide tighter monitoring tolerances. Such techniques may not be feasible when system complexity and/or lack of resources (computing or otherwise) makes it difficult to develop such detailed models. In addition, even when such an expert knowledge base or detailed system model can be constructed, it is frequently too complex for feasible computer processing in real-time. It is desired in many applications that system health be monitored rapidly as the system is in service to detect and commence ameliorating action before off-nominal behavior becomes irretrievable or catastrophic.

Other technologies, such as neural networks and decision trees, have been applied to the monitoring of complex systems attempting to overcome the modeling difficulties noted above. Such techniques typically suffer from the limitation of requiring both nominal and off-nominal training data to produce a feasible monitoring system. In addition, such monitoring systems typically produce system "models" that are difficult for humans to interpret. Since off-nominal system data are frequently difficult to obtain, in an illustrative embodiment the present invention is designed to avoid this difficulty by building a system monitoring knowledge base entirely from nominal system data. The resulting knowledge base clearly shows relationships between system parameters during normal operation and, in most cases, is easily processed to provide real-time (or near real-time) monitoring ability.

Indexing and Retrieval

An efficient cluster indexing and retrieval method is advantageous in increasing the speed and allowing the outlier detection module 30 to operate in real-time or near-real-time. In order to allow searching of the cluster database for the closest cluster, some embodiments of the indexing and retrieval scheme include a distance metric by which "closest" is defined and the ability to return the record of the cluster that is closest to the query point (input vector), not limited to those clusters containing the query point. The speed of search and retrieval should also be sufficiently fast so as to keep up with the anticipated rate of data acquisition. An efficient indexing and retrieval scheme can also help to increase the speed of the initial training process, since training also performs "closest cluster" queries. Various embodiments of the cluster indexing and retrieval methods used in connection with the present invention make use of one or more indexing reference points.

Cluster Indexing and Retrieval

Figure 10:
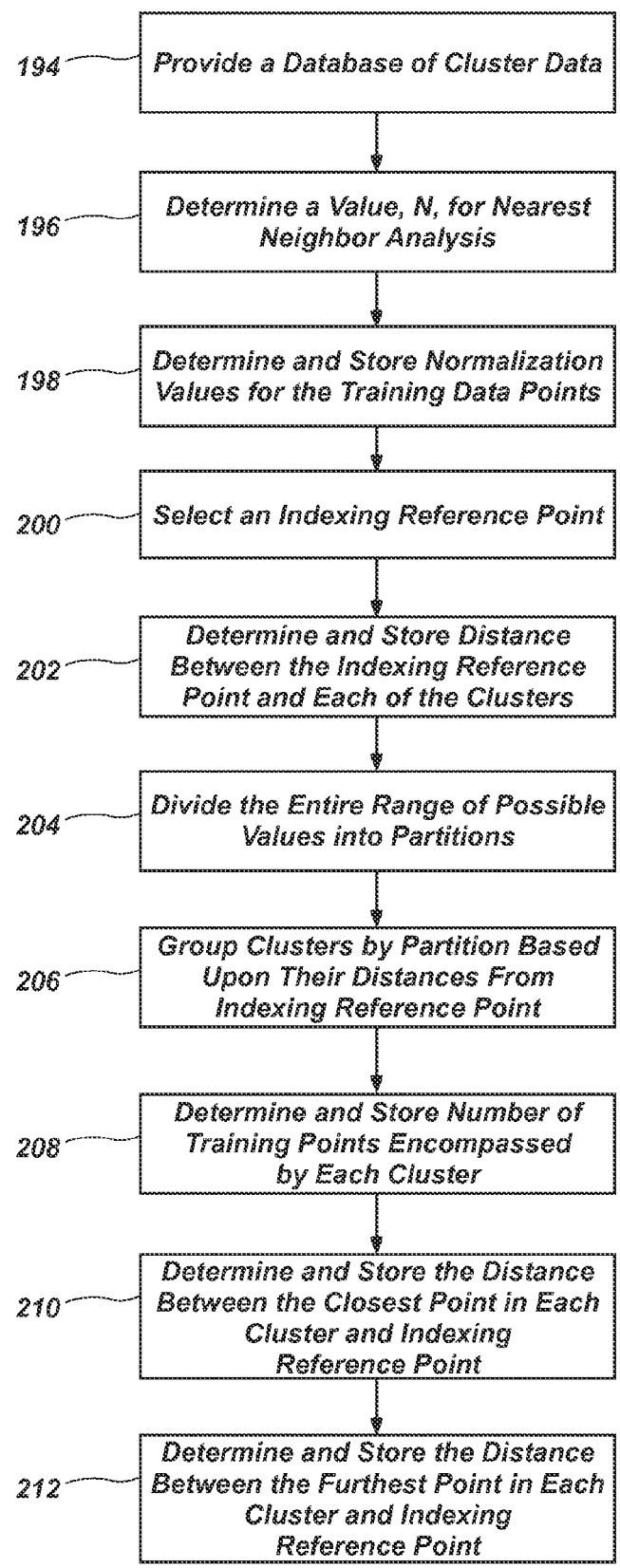
FIG. 10 depicts a flowchart of an illustrative embodiment of a technique to group clusters in the cluster database by the outlier detection module of FIG. 1.

FIG. 10 depicts a flowchart of typical illustrative embodiments of a cluster indexing technique employing a single indexing reference point. In some embodiments, the cluster indexing technique is part of the inductive learning module 24. In some embodiments, the cluster indexing technique is part of the outlier detection module 30. In other embodiments, the cluster indexing technique is implemented in a separate module altogether. The cluster indexing and retrieval technique typically makes use of the cluster distance concept.

Figure 11:
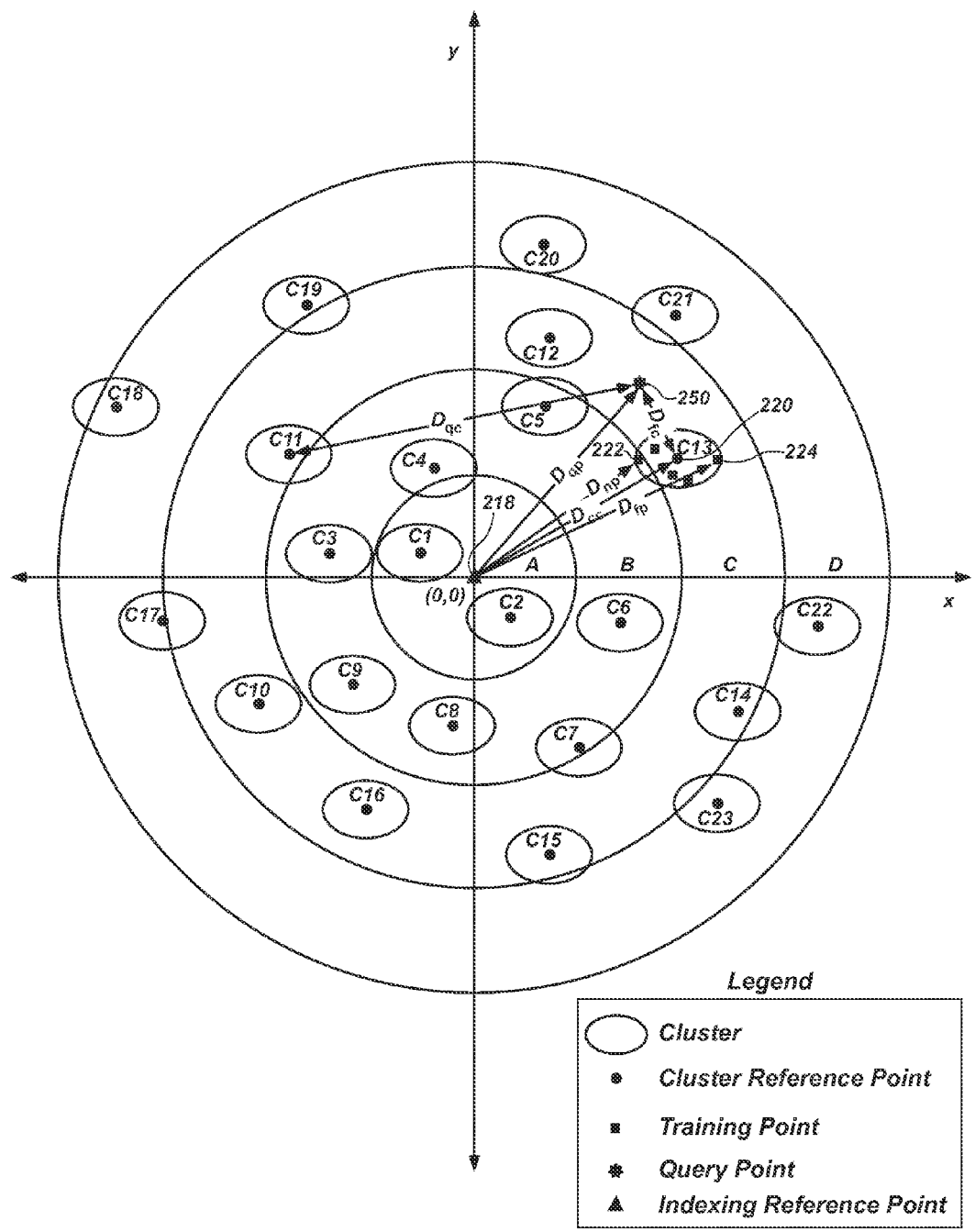
FIG. 11 depicts a chart of an illustrative embodiment of a technique to group clusters.

Throughout the discussion of FIG. 10, reference will be made from time to time to FIG. 11. FIG. 11 depicts clusters C1-C23 and their respective cluster reference point on an XY graph. FIG. 11 further depicts a plurality of partitions that will be explained below. Although FIG. 11 depicts a two-dimensional space, it is to be understood that the concepts disclosed in FIG. 11 may be expanded to any N-space. It will be further understood that FIG. 11 is presented for illustrative purposes only, and should not be deemed limiting on the scope of the present disclosure.

The technique may begin at step 194 by providing a database of cluster summary or modeling data. In step 196, a value, N, is determined for facilitating a nearest neighbor search. In particular, the value, N, specifies the number of nearest neighbor points or clusters in relation to a proximity search. The value, N, may be utilized for data normalization as well as for specifying the number of closest points or clusters. In an embodiment of the present disclosure, a user may be prompted to provide the value, N. In other embodiments, the technique may use a predetermined value of N.

In step 198, a normalization value for the training points is determined and stored. In regard to the training points, the technique determines the standard deviation of the training points from their N nearest neighbor points, where N is the value of N determined above. It will be appreciated that the distance of a query point from their N nearest neighboring clusters can be expressed in terms of this statistical measure for better interpretability and consistency across different data sets.

In step 200, an index reference point is selected. The choice of the indexing reference point is substantially arbitrary and can be chosen for convenience of calculation. For example, the indexing reference point can be the origin (all parameter values are zero), centrally located to many clusters, among other choices as shown in FIG. 11. In step 202, a distance, referred to as the ordering distance, from the indexing reference point to each cluster is determined. As noted above, "distance to a cluster" can be determined from the indexing reference point to a cluster reference point selected for each cluster, such as a cluster centroid, or making use of maximum and minimum values of the distance from the indexing reference point to cluster members, among other methods. The ordering distance may be determined using the Euclidian distance formula described above, among others. Any of the techniques above for determining a cluster reference point may be used. In FIG. 11, a distance $D_{cc}$ between the origin 218, the selected indexing reference point, and a cluster centroid 220, the selected cluster reference point, for cluster C13, is shown. Once determined, the distance to each cluster from the indexing reference point may be stored.

In step 204, the entire range of expected values is divided into partitions. Each partition may span a range. The range spanned by each partition may be selected by a user. In some embodiments, the range spanned by each partition is equal. In some embodiments, the range spanned by each partition is not equal. In FIG. 11, the space is divided into four partitions, namely, Partitions A, B, C, and D. Each of the ranges may form a ring centered on the origin. The use of the Partitions A, B, C, and D shown in FIG. 11 is exemplary as typically more partitions are desired. In some embodiments, the number of partitions may exceed 100 partitions, such as 128 or 256 partitions. In some embodiments, the number of partitions may exceed 1000. A lower bound of each partition may be defined as a distance from the origin. An upper bound of each partition may also be defined as a distance from the origin. The partitions are non-overlapping.

In step 206, the clusters are grouped by partition. That is, the clusters are indexed by the distance of their cluster reference points from the indexing reference point. Clusters with cluster reference points, e.g., centroids, in a given partition are grouped together. Each cluster is assigned to only one group. For example, one group can be constructed containing clusters from 0 to 100 distance units away from the indexing reference point. A second group having clusters from greater than 100 to 200 distance units away from the indexing reference point, and so forth until all clusters are included in at least one group. For example, referring to FIG. 11, clusters C1 and C2 would be grouped under Partition A. Clusters C3-C9 would be grouped under Partition B. Clusters C10-C16 would be grouped under Partition C. Clusters C17-C23 would be grouped under Partition D.

In step 208, the number of training points in each cluster is counted and stored. Referring to FIG. 11, cluster C13 is shown to contain five training points (the training points in the other clusters are not shown, but may be assumed to be present). In step 210, the distance between the closest point in each cluster and the indexing reference point is determined and stored. In FIG. 11, the closest training point 222 in cluster C13 has a distance of $D_{np}$ from the origin 218, the selected indexing reference point. In step 212, the distance between the furthest point in each cluster and the indexing reference point is determined and stored. In FIG. 11, the furthest training point 224 in cluster C 13 has a distance of $D_{fp}$ from the origin 218, the selected indexing reference point.

FIG. 12 depicts an exemplary database table 230 that may be populated according to the technique described in FIG. 10 using cluster C13 shown in FIG. 11. In particular for each cluster, the technique may determine and store the distance $D_{cc}$ between the cluster reference point and the indexing reference point. The technique may also determine and store the distance $D_{np}$ between the nearest training point in a cluster and the indexing reference point. The technique may also determine and store the distance $D_{fp}$ between the furthest training point in a cluster and the indexing reference point. The technique may also determine and store the number of training points in each cluster. The technique may also determine and store which group a cluster has been assigned, e.g., the partition to which the cluster belongs.

Figure 13A:
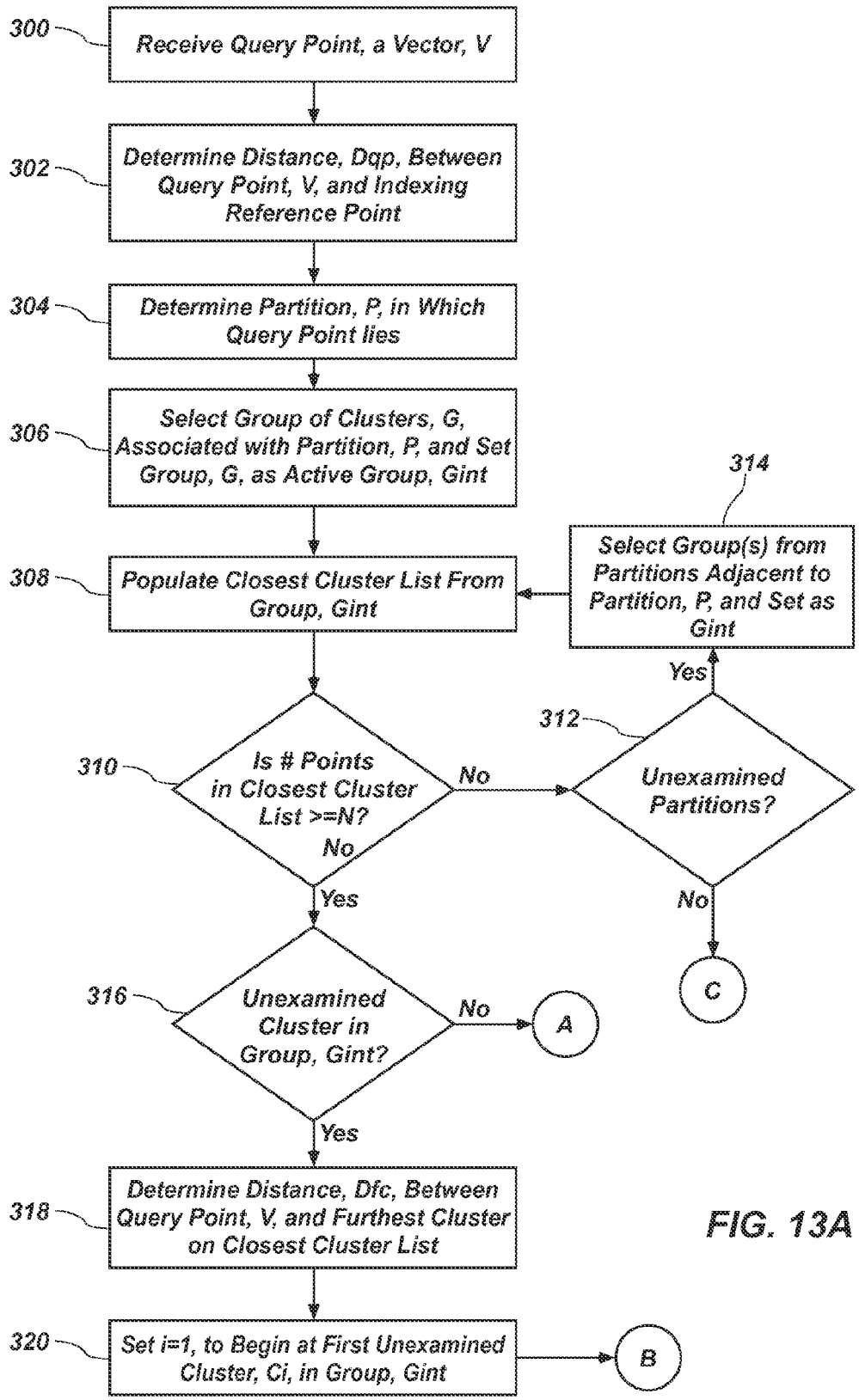
FIGS. 13A-13C depict a flowchart of an illustrative embodiment of a technique to determine if a query point is an outlier.
Figure 13B:
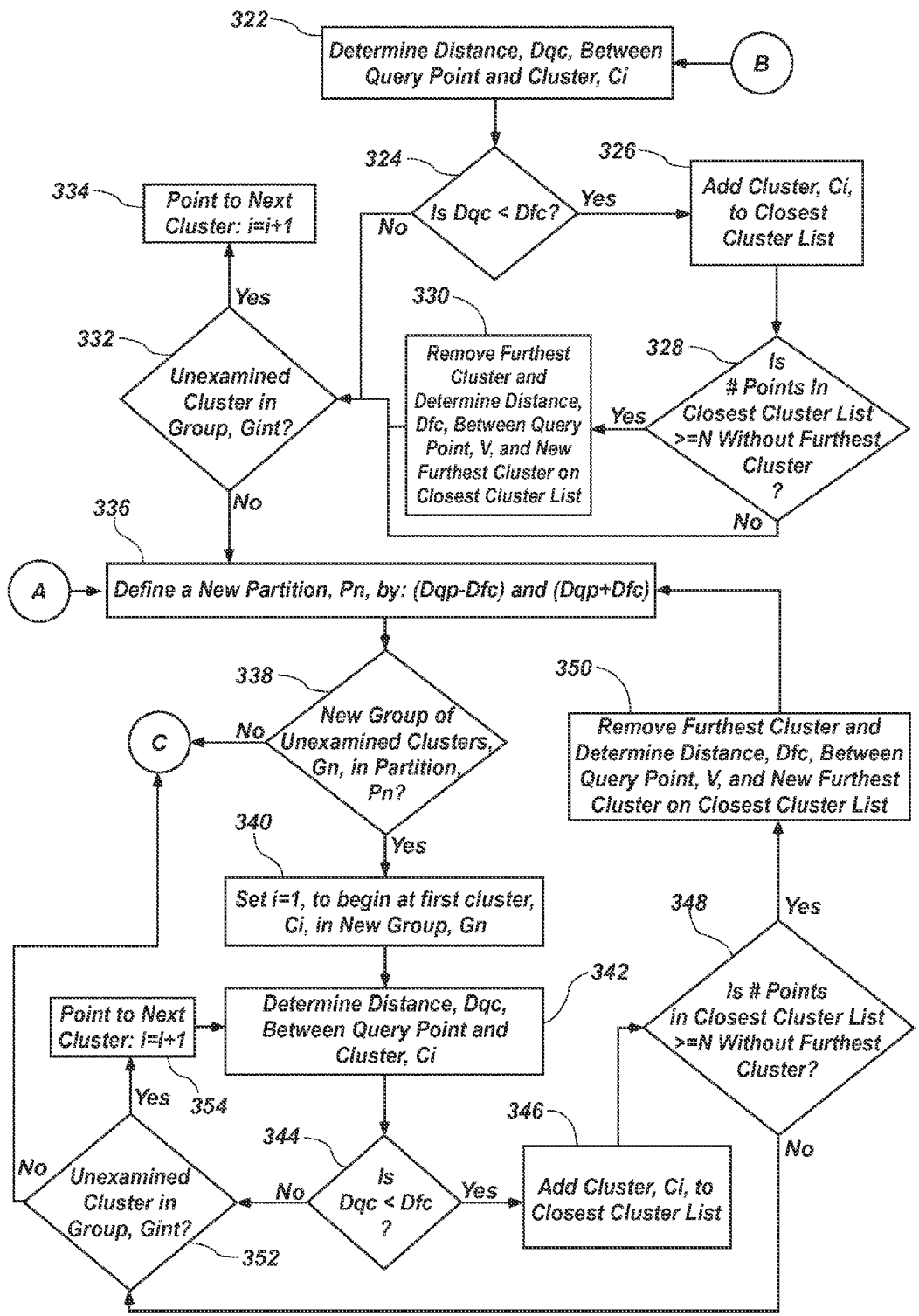
Figure 13C:
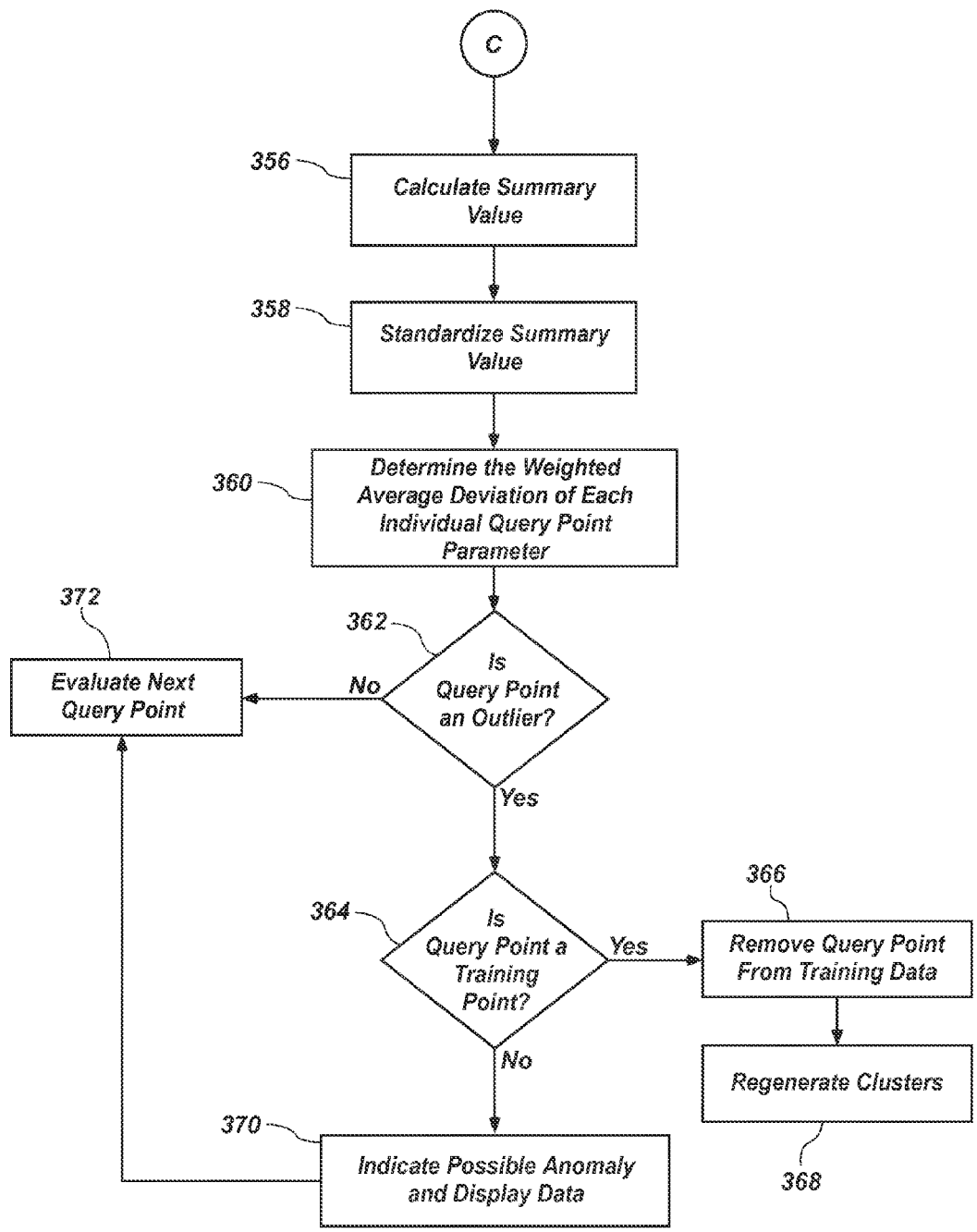
Figure 14:
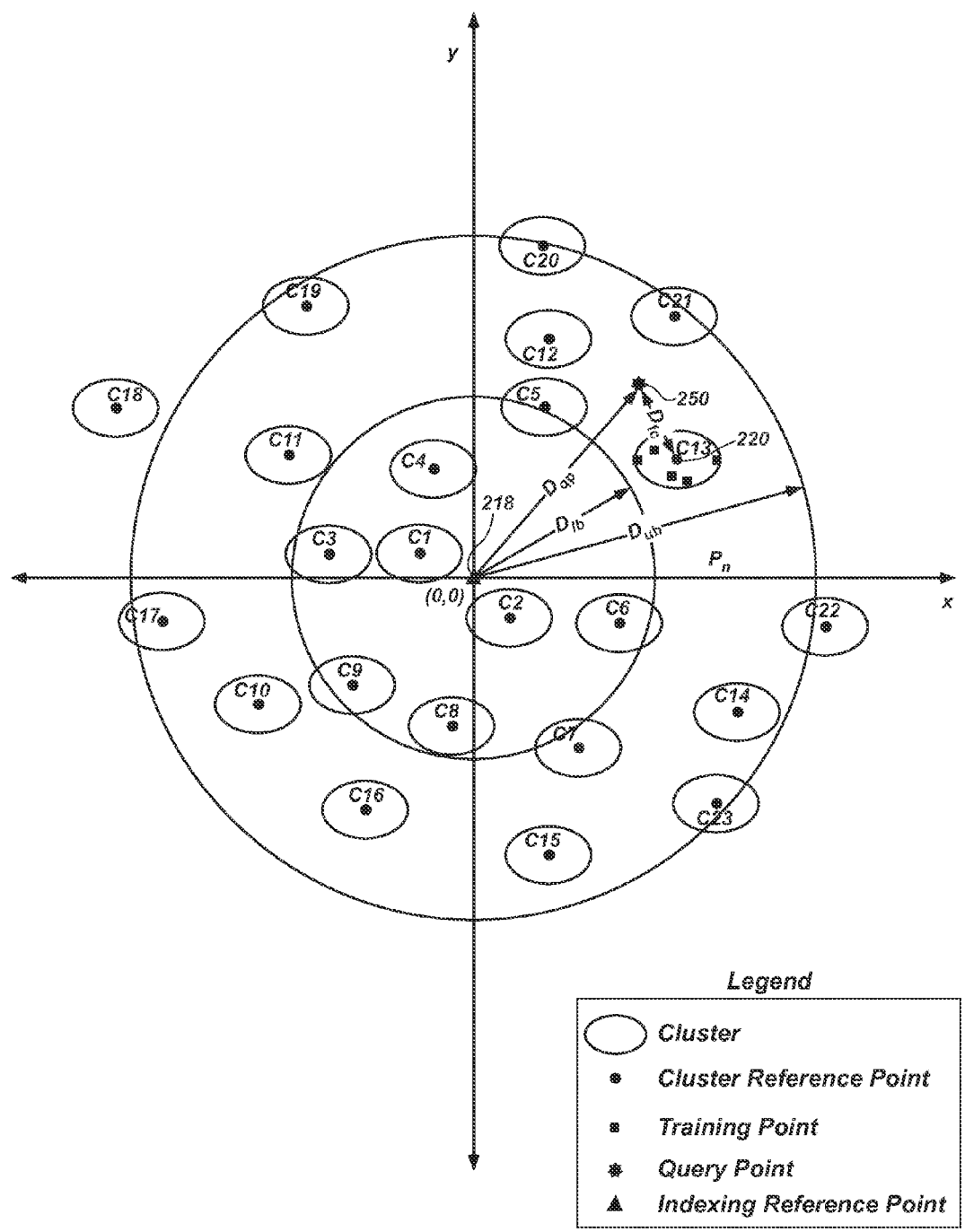
FIG. 14 depicts a chart of an illustrative embodiment of a technique to determine if a query point is an outlier.
Figure 15:
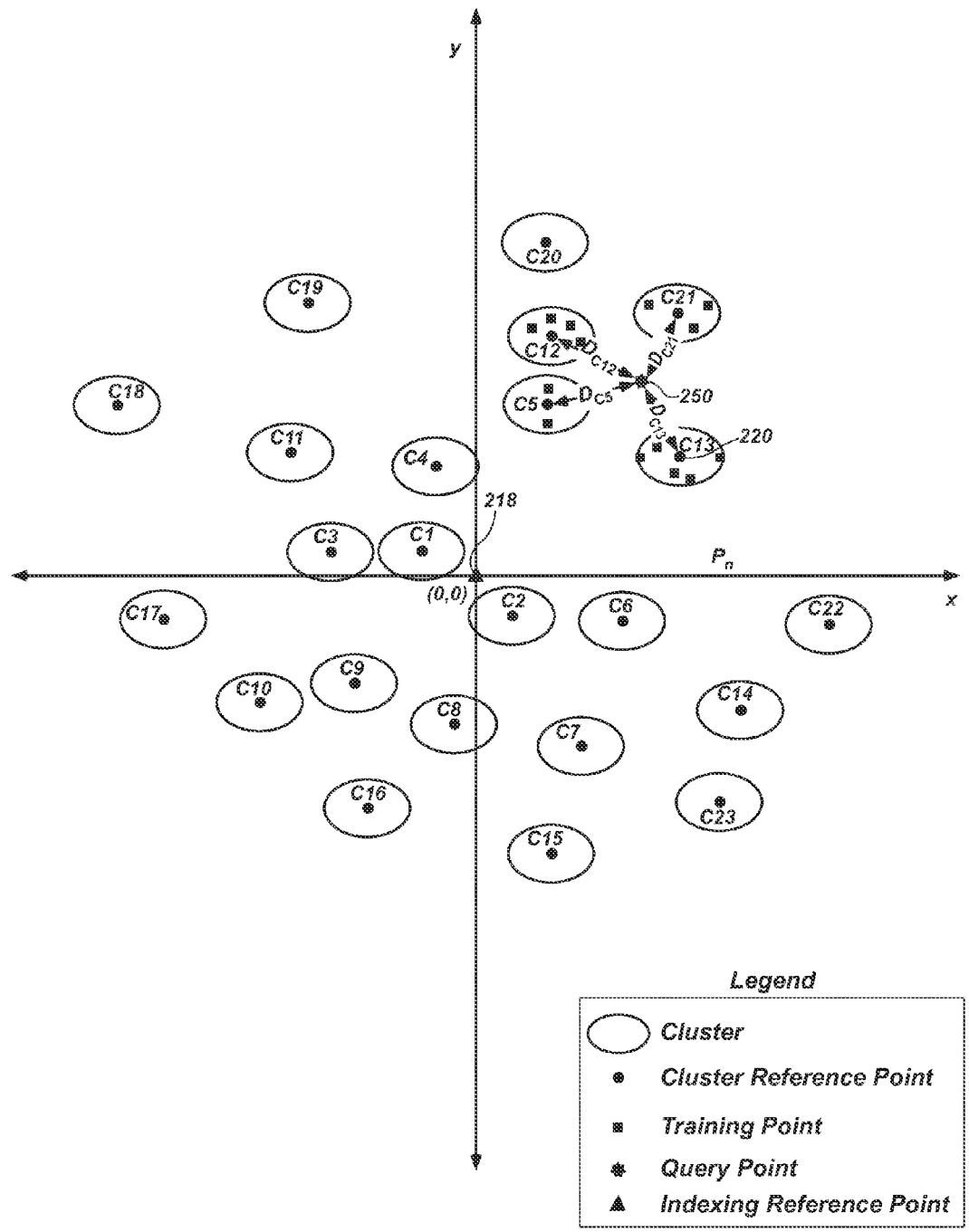
FIG. 15 depicts a chart of an illustrative embodiment of a technique to determine if a query point is an outlier.

FIGS. 13A-13C depict a flowchart of a technique for outlier detection according to an embodiment of the present disclosure. The inductive learning module 24 and/or the outlier detection module 30 may use the technique of FIG. 13A-13C. The technique will be described in the context of the outlier detection module 30. Again, to facilitate the understanding of the cluster indexing technique disclosed in FIGS. 13A-13C, reference will be made from time-time in the below discussion to FIGS. 11, 14, and 15. FIG. 11 is described above. FIGS. 14 and 15 depict many of the same items that were depicted in FIG. 11, including clusters C1-C23 and their respective cluster reference point on an XY graph. FIG. 14 further depicts a new partition that will be explained below. Although FIGS. 14 and 15 depict a two-dimensional space, it is to be understood that the concepts disclosed in FIGS. 14 and 15 may be expanded to any N-space. It will be further understood that FIGS. 14 and 15 are for illustrative purposes only, and should not be deemed limiting on the scope of the present disclosure.

In step 300, the outlier detection module 30 receives a query point in the form of a vector, V. The query point, V, may be training data or may represent real-time data acquired from sensor readings. For example, in FIG. 11, the location of an exemplary query point 250 is shown on the graph in relation to the clusters C1-C23. In step 302, a distance, $D_{qp}$, between the query point and the indexing reference point used to cluster the training point data is determined. For example, in FIG. 11, the distance, $D_{qp}$, between the query point 250 and the indexing reference point 218 is shown.

At step 304, the partition, P, in which the query point lies is determined using the distance $D_{qp}$ between the query point 250 and the indexing reference point 218. Again, the partitions should be the same partitions used to group the clusters during indexing. For example, in FIG. 11, it can be observed that the query point 250 falls between the lower and upper boundaries of Partition C.

In step 306, the group of clusters, G, that fall within the partition in which the query point lies is selected. For example, in FIG. 11, the group of clusters, G, in Partition C includes clusters C10-C16. In step 306, the group of clusters, G, is set as the initial list of clusters, $G_{int}$. At step 308, a closest cluster list is initialized and populated by adding clusters from the group, $G_{int}$, to the closest cluster list. The selection of the initial clusters from the group, $G_{int}$, may be random. Alternatively, the selection of the initial clusters may be based upon the closest clusters in group, $G_{int}$, to the previous query point that was analyzed. For example, in FIG. 11, cluster C13 has been selected as the initial cluster in the closest cluster list.

In an embodiment of the present disclosure, the closest cluster list includes a running list of the closest clusters to the query point as determined by the distance between the query point and a cluster reference point of a cluster. As will be explained below, the closest cluster list is continuously updated when a new closer cluster is found. The furthest cluster in the list may be removed.

At step 310, the closest cluster list is populated from the group, $G_{int}$, until the number of training points in the clusters in the closet cluster list is greater than or equal to the value, N (determined at step 196 in FIG. 10). At steps 312 and 314, in the event that the clusters in group, $G_{int}$, do not contain enough training points to meet or exceed the value, N, then the technique may expand to investigate adjacent clusters to build the initial cluster list. For example, in FIG. 11, the technique may use the clusters in Partitions B and D to populate the closest cluster list if Partition C does not contain enough clusters. If at step 312, there are no unexamined partitions, i.e., the sum of all the training points in all of the clusters does not meet or exceed the value, N, then the technique will proceed using the clusters available to step 356 with the limited data available.

Once the closest cluster list has been built, the technique will determine if any clusters in group, $G_{int}$, remain unexamined at step 316. If no, the technique will proceed to step 336. If there exists unexamined clusters in group, $G_{int}$, the technique will proceed to determine if the unexamined clusters are closer to the query point, V, than the current clusters on the closest cluster list. At step 318, a distance, $D_{fc}$, is determined between the query point, V, and the furthest cluster on the closest cluster list. For example, in FIG. 11, the distance, $D_{fc}$, between the query point 250 and the cluster C13 is shown.

At step 320, a counter, i, is set to 1, and the first unexamined cluster, $C_i$, in the group, $G_{int}$, is selected. At step 322, the distance, $D_{qc}$, between the query point and the cluster, $C_i$, is determined. For example, in FIG. 11, the distance, $D_{qc}$, between the cluster C11 and the query point 250 is shown. At step 324, it is determined if the distance, $D_{qc}$, is less than the distance, $D_{fc}$. If yes, then at step 326, the cluster, $C_i$, is added to the closest cluster list because it is closer to the query point than the furthest cluster on the list.

At step 328, it is determined whether the number of points in the clusters on the closest cluster list meets or exceeds the value, N, without the furthest cluster on the closest cluster list. If yes, then at step 330, the furthest cluster on the closest cluster list is removed and a new distance value, $D_{fc}$, between the query point and the new furthest cluster on the closest cluster list is determined. The technique then proceeds to step 332, where it is determined if an unexamined cluster remains in cluster group, $G_{int}$. Likewise, if no at steps 324 and 328, the technique also proceeds to step 332.

At step 332, if an unexamined cluster remains in cluster group, $G_{int}$, then at step 334, the counter is advanced and the technique loops to step 322. In this manner, the technique will continue to replace clusters on the closest cluster list with other clusters in group, $G_{int}$, that are closer to the query point than those clusters on the closest cluster list. Once all of the clusters in cluster group, $G_{int}$, have been examined, the technique will proceed to step 336.

At step 336, a new partition, $P_n$, is defined by $(D_{qp}-D_{fc})$ and $(D_{qp}+D_{fc})$. For example, as seen in FIG. 14, new partition, $P_n$, has a lower bound, $D_{lb}$, defined by $(D_{qp}-D_{fc})$ and an upper bound, $D_{up}$, defined by $(D_{qp}+D_{fc})$. The new partition, $P_n$, includes clusters C7, C10-C17, C19-C21, and C23. At step 338, the technique determines if the new partition, $P_n$, comprises any clusters in a new group, $G_n$, that have not yet been examined.

If yes, then in step 340, a counter, i, is set equal to 1 to begin at a first cluster, $C_i$, in the new group, $G_n$. At step 342, the distance, $D_{qc}$, between the query point and the cluster, $C_i$, is determined. At step 344, it is determined if the distance, $D_{qc}$, is less than the distance, $D_{fc}$. If yes, then at step 346, the cluster, $C_i$, is added to the closest cluster list because it is closer to the query point than the furthest cluster on the list. Then, at step 348, it is determined whether the number of training points in the clusters on the closest cluster list equals or exceeds the value, N, without the furthest cluster on the list. If yes, then at step 350, the furthest cluster on the closest cluster list is removed and the technique loops back to step 336.

If no at steps 344 or 348, the technique proceeds to step 352. At step 352, it is determined whether there exists any unexamined clusters in the group, $G_n$. If yes, then in step 354, the counter, i, is advanced, and the technique loops back to step 342, which will then determined if the unexamined cluster is closer than the furthest cluster on the closest cluster list. If no at step 352 or step 338, then the technique proceeds to step 356. (If this is the case, this means that there is no possible closer clusters than those clusters on the closest cluster list.)

At step 356, a summary value for the query point, V, is determined when the closest cluster list contains all of the closest clusters to the query point, V, having N nearest neighbor points. In an embodiment of the present disclosure, the summary value may be the weighted average distance of the query point, V, to the clusters in the closest cluster list determined by:

$$\frac{\sum_{i=1}^{p} w_i d_i}{N} \qquad \text{Eq. 2}$$

where
p=total number of clusters in closest cluster list,
w=number of training points in a cluster,
d=distance between query point and a cluster, and
N=number of nearest neighbors.

For example, in FIG. 15, clusters C5, C12, C13 and C21 have been determined to be the closest clusters to the query point 250. If $D_{c5}$=10 units, $D_{c12}$=13 units, $D_{c13}$=15 units, and $D_{c21}$=11 units, then, using Eq.(2), the summary value would be (2(10)+4(13)+5(15)+3(11))/14, which is equal to 12.86. It should be noted that in the event that the furthest cluster on the closest cluster list contains more training points than is necessary to reach the value, N, then only the points needed to reach value, N, are utilized.

At step 358, the summary value calculated at step 356 is standardized. In an embodiment of the present disclosure, this may include dividing the summary value calculated at step 356 by the standard deviation of all of the training points from their N nearest neighbor points, which may have been determined at step 198 in FIG. 10.

It will be appreciated that at this point, the clusters on the closest cluster list and the query point, V, are expressed in terms of their weighted scaled values, and at step 358, a summary or composite deviation value was calculated. At step 360, the technique will determine how much each parameter in query point, V, is contributing to that overall composite deviation calculated at step 358. The required data for this step includes the query point, V, and the list of closest clusters containing up to N nearest training points. To find the contribution of each parameter, the technique runs through the list of closest clusters and for each query point parameter, the techniques calculate how far the query value for that parameter falls from each cluster (usually from the centroid of the cluster, but it can also calculate the distance to the edge of the cluster in that dimension). That distance is multiplied by the number of training points represented by that cluster, then the same calculation is performed for the next cluster in the list, keeping a running total of the results for each parameter. When the furthest cluster in the list is reached, only multiply by the number of points required to reach a total of N, since the closest cluster list may represent more than N points.

Then each sum (one per parameter) is divided by N to determine the weighted average distance of each parameter from the clusters in the closest cluster list. This helps figure out which parameters of the query point are incongruous and likely the cause of the detected anomaly. When completed, each query point will produce k+1 scalar results, the composite deviation, calculated in step 358, and the average distance of each parameter in the query point to the closest clusters calculated in step 360.

At step 362, it is determined whether or not the query point is an outlier. This may be done by comparing the standardized summary value calculated in step 358 to a range of expected values. If the standardized summary value falls outside of the range of expected values, then the query point, V, may be an outlier. If it is determined that the query point, V, is an outlier, then at step 364 it is determined whether the query point, V, is a training point. If yes, then at step 366, the query point, V, is removed from the training data and then, at step 368, the cluster database is regenerated without the query point, V.

If at step 364, the query point, V, is not training data, this means that the query point, V, represents real time sensor data. The technique will proceed to step 370, which will indicates to a user that a possible anomaly has occurred. In addition, the technique may display the weighted average deviation of each individual query point parameter such that the parameters causing the deviation can be determined. This can help identify the source of the deviation and, in a system health monitoring application, help isolate and diagnose the cause of the anomaly. This parameter deviation value can be expressed in terms of percentage of expected parameter range, standard deviation of differences calculated for that parameter when finding nearest neighbor values, or similar normalizing techniques. After step 370, the technique will advance to step 372 to evaluate the next query point.

It will be appreciated that for faster analysis performance, a smaller number of larger clusters can be used to summarize the data set, reducing the size of the nearest neighbors search space.

Figure 9:
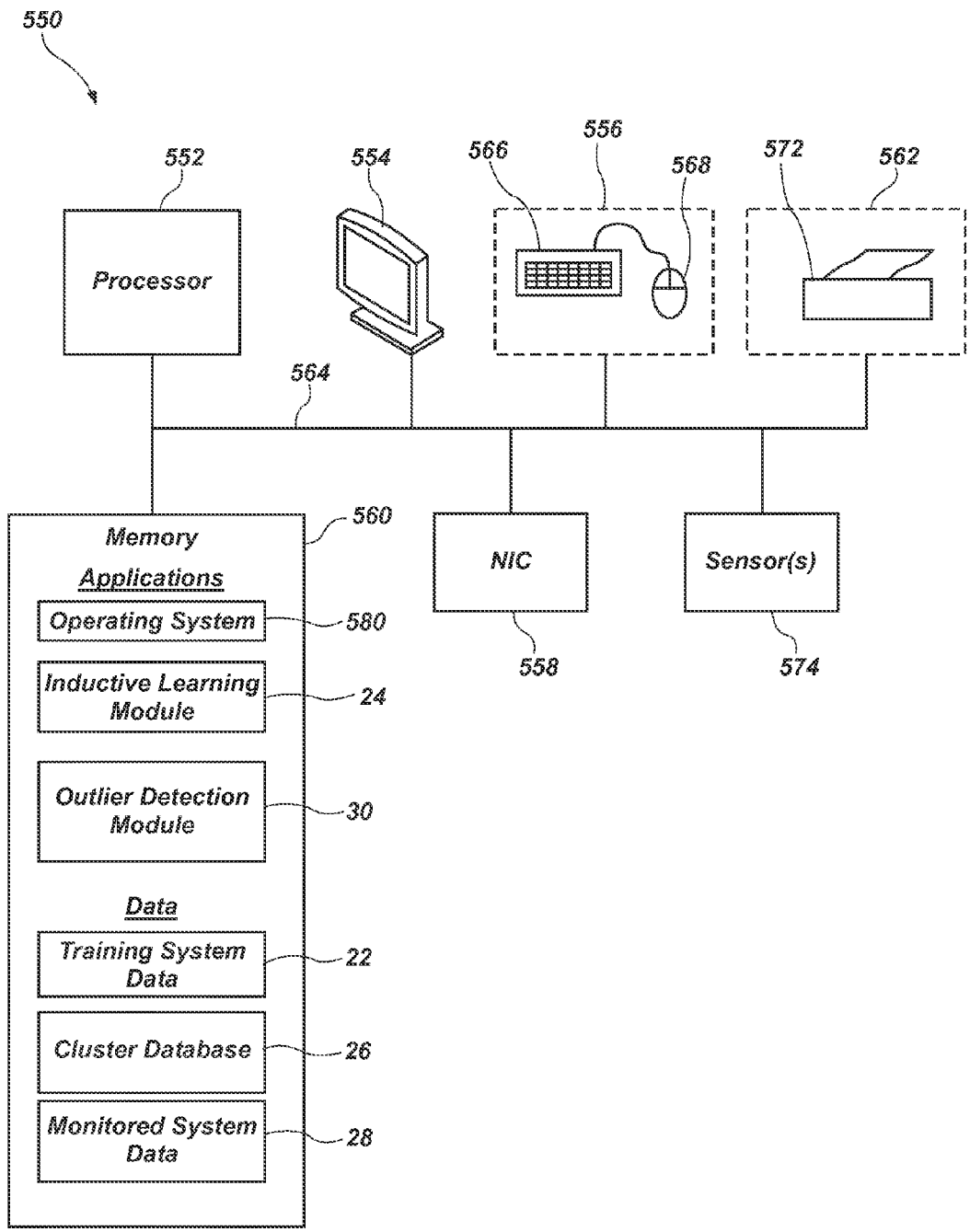
FIG. 9 depicts a block diagram of a computer system for implementing the methods and techniques of an illustrative embodiment of the present invention.

FIG. 9 depicts an illustrative computer system 550 that utilizes the teachings of the present invention. The computer system 550 may implement any of the processes, methods, and techniques described herein as constituting the present invention. The computer system 550 comprises a processor 552, a display 554, input interfaces 556, communications interface 558, memory 560, and output interfaces 562, all conventionally coupled by one or more busses 564. The input interfaces 556 comprise a keyboard 566 and mouse 568. The output interface 562 is a printer 572. The communications interface 558 is a network interface card (NIC) that allows the computer 550 to communicate via a network, such as the Internet. Sensors 574 are also coupled to, or otherwise in communication with, the processor 552. The sensors 574 supply real-time input data from a monitored system. The sensors may provide sensor data, such as pressure data, flow data, positional data, acceleration data, velocity data, and/or temperature data of a monitored system (not shown). The sensor data may be utilized to form a query point or query vector.

The memory 560 generally comprises different modalities, illustratively semiconductor memory, such as random access memory (RAM), and disk drives. Depending on the embodiment, the memory 560 may include applications and data. The memory 560 stores one or a combination of the following software applications: an operating system 580, an inductive learning module 24, and an outlier detection module 30. The memory 560 further stores one or a combination of the following data: training system data 22, a cluster database 26, and monitored system data 28. The operating system 580 may be implemented by any conventional operating system such as UNIX, WINDOWS, and LINUX, among others.

The training system data 22 may typically comprise any of archived data, nominal data and off-nominal data. The inductive learning module 24 typically comprises a cluster generation module that, for example, implements the flowchart of FIG. 7, FIG. 8, or FIG. 10. The outlier detection module 30 typically comprises a cluster retrieve module that, for example, implements the flowchart of FIGS. 13A-13C.

Various embodiments of the present inventive techniques are typically incorporated in the inductive learning module 24, the cluster database 26, and the outlier detection module 30. Generally, the inductive learning module 24 and the outlier detection module 30 are tangibly embodied in a computer-readable device, carrier or medium, for example, memory 560, and are comprised of instructions which, when executed, by the processor 552 of the computer system 550, causes the computer system 550 to perform the techniques described herein.

Various embodiments of the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Those skilled in the art will recognize that many modifications may be made to this configuration without departing from the scope of the present invention.

The exemplary computer system illustrated in FIG. 9 is not intended to limit the present invention. Other alternative hardware environments may be used without departing from the scope of the present invention.

Outlier Detection and Data Cleaning

It will be appreciated by those having skill in the art that the N nearest neighbors analysis described herein allows the use of system models to analyze the training data used to build those models in order to find outlier points in the training data itself. In most cases it is not desirable to include these outlier points in the nominal system model since they likely represent off-nominal behavior. In this case, the query point is simply a point within the training data.

After an initial model is built using the candidate training data by the learning module 24, an analysis is performed using the model on that same data, calculating the average distance to the nearest neighbors within the training data set for each point in the data set using the outlier detection module 30. Training data points with larger than typical average distance scores are likely off-nominal outliers and candidates for elimination from the nominal training data set.

There are two approaches to trimming these outlier points. The first is user specification of maximum distance score thresholds. Data points with distance scores above a threshold are removed from the training data set. The threshold value may vary in different segments of the data to account for periods of differing system activity. A convenient approach to implementing this threshold data editing is to graphically plot the distance scores of the training data points and allow the user to draw threshold lines on the graph with a mouse or other input device. Points with scores above threshold lines are discarded from the training data.

A second, more automated, approach to trimming outlier points incorporates techniques from statistical process control or other change detection methods. In this method the sequence of nearest neighbor distance scores are analyzed by a change detection method, such as Shewhart Control Charts, CUSUM, or EWMA charts. These methods track the variation of data values in the entire data set, or within a moving window of the set, and identify values that are unusual relative to the other data points. For instance, in the control chart technique any points with values outside of three standard deviations from the mean are considered unusual (other conditions, documented in the literature, can also qualify as unusual). Points deemed unusual by change detection analysis which fall above the mean or expected distance value are candidates for removal from the training data set. Since distances are always non-negative, an alternate approach is to consider deviation above zero rather than the mean data value or other baseline value used by the change detection method.

After the training data set has been updated with either of these data cleaning approaches, the remaining training data are used to build an updated system model. The data cleaning process may be iterative, repeating the process using the updated model and data to remove any outliers that may have been missed on previous passes. The techniques are also used for incorporating new data into existing training data sets. The new data are analyzed with the existing model to find and remove outliers before they are added to the training data set and incorporated into an updated system model.

Outside of data cleaning activity, the change detection approach described above can be used to detect unusual events in real-time monitoring of operations data or analysis of archived data not included in the training data set. The application of change detection methods to an analysis results provides an analytical approach to discovering system anomalies and determining when to alert the operators or analysts. This is particularly useful in monitoring dynamic systems where a fixed alert threshold may not be appropriate for all phases of operation.

Parameter Weight Adjustment

As described above, the present invention considers multiple system parameters of a query point simultaneously. Typically, some parameters of a query point may provide more information about system health than others, and their values should be more influential in the overall health assessment. To accomplish this, in an embodiment of the present disclosure, the inductive learning module 24 or the outlier detection module 30 may assign a numeric weight to each monitored parameter that increases or decreases the relative contribution of that parameter to the calculated distance scores.

As described above, the present invention provides the option of calculating the contribution of each individual parameter to any given deviation distance calculation. These contribution values reflect the average distance of the parameter value from the corresponding parameter value in the N nearest points. These parameter contributions can be determined for points in the training data to provide the additional capability of weight adjustment using only the initial training data set.

Cleaned, nominal data sets are used for parameter weight adjustment, or tuning. A knowledge base (model) is built from designated training data using initial or default parameter weights. Then the nominal data sets are analyzed with that knowledge base using a "calculate parameter contribution" option. Outlier or unusually high composite distance scores are identified using the threshold or change detection methods described previously, usually with more stringent outlier designation criteria. Since the analyzed data are known nominal data, it is desirable to reduce or eliminate these higher distance scores. The individual parameter contributions are considered for each point identified in the data set with a higher distance score. A summary of the contribution of each parameter to those scores is calculated, typically the mean parameter deviation for all of those points, or the maximum parameter deviation for any one point. Other summarizing metrics can also be used. This summary results in a single value for each parameter that reflects its contribution to the higher distance scores. Since the goal is to reduce those scores, the weights on the parameters with the highest contributions are decreased. This is done by reducing the weight of each parameter proportional to the amount of contribution of that parameter, with the weights of the largest contributors reduced by the highest percent.

The relative weight reduction versus parameter contribution is selectable by the user to influence the granularity of the weight tuning Smaller adjustments with multiple iterations of the weight adjustment process will result in more precise tuning at the expense of a longer tuning process. Once the weights are adjusted according to parameter contributions, the knowledge base is updated with the new weights and the weight adjustment routine is repeated until most or all significant distance deviations are eliminated from the nominal data analyses.

In some installations, the users are accustomed to system monitoring scores within a certain range. For instance, they may want to set fixed alert limits on their monitoring workstations and prefer that nominal system behavior typically display distance scores between zero and three, while distance values above five warrant additional attention.

Since each monitored system has unique characteristics, the typical "normal" distance range can vary between systems. It is possible to influence the "normal" range in most cases by increasing or decreasing the parameter weights as a group or adjusting the knowledge base build parameters that influence the size of the generated clusters. A process similar to the individual parameter weight adjustment described previously can be used to accomplish this "normal" distance range tuning. In this case, the composite deviation distance for nominal data sets is summarized with the same techniques as used for the individual parameter contribution summaries above (e.g., determining the mean value of the calculated distance for all points in the nominal data set). This summary value is compared to the desired value range, and the weights or knowledge base build parameters are adjusted accordingly. If the actual value is higher than the desired value, all of the data parameter weights are decreased and/or knowledge base build parameters (extrapolation and initial tolerance) are adjusted to increase the size of the generated clusters. The opposite adjustments are made if the actual values need to be increased to meet the desired values. The amount of weight or parameter adjustment is relative to the difference between the desired and actual values. The process is iterated until desired values are achieved.

Automated Knowledge Base Generation and Online Model Updates

It will be appreciated that the techniques described above for cleaning training data and adjusting parameter weights enable automation of the model building process for distance-based health monitoring applications. Starting with a representative data set collected from the target system, the data cleaning techniques are used to remove off-nominal points from that data and create a nominal training data set. Next, the parameter weight adjustment routines are applied to set suitable weights. A new knowledge base (system model) is then generated with the cleaned data using the updated parameter weights. This effectively provides a "one button" monitoring system generation capability by automating many steps of the process that were previously performed manually.

Additionally, the data cleaning and weight adjustment techniques can be incorporated into real-time monitoring routines to update system models online during system monitoring operations. Incoming data not deemed off-nominal by the change detection or threshold routines would be automatically incorporated into the system model, continuously refining it to provide better monitoring performance. In the event that normal system operation resulted in excessive monitoring deviations, the weight adjustment routines would be activated to retune the system model. The returned model would better characterize the additional nominal system behavior information that had been observed online but was not included in the original training data set.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of detecting anomalies in a behavior of a system implemented by a processor coupled to a memory, the memory having stored therein a set of instructions, that when executed by the processor, cause the processor to perform the method comprising:
    (a) providing cluster modeling data for a plurality of clusters to an outlier detection module, the cluster modeling data identifying a number of training points in each of the plurality of clusters;
    (b) receiving a query point at the outlier detection module, the query point comprising a plurality of parameters, the query point including training data provided by the plurality of sensors in real-time or near real-time, wherein the sensors provide sensor data, wherein the sensor data including at least one of pressure data, flow data, position data, acceleration data, velocity data and temperature data, wherein the sensor data utilized to form the query point;
    (c) generating a group of closest clusters that is closest to the query point from the plurality of clusters, using the outlier detection module and determining if the group of the closest cluster is satisfied a threshold value, wherein the threshold value is a user-defined value;
    (d) determining a weighted distance value between the query point and each cluster in the group of closest clusters using the outlier detection module, wherein the weighted distance value, WDV, between the query point and each cluster in the group of closest clusters is determined by:

$$WDV = nd$$

where n is the number of the training points in a cluster and d is the distance between the cluster and the query point;
    (e) generating a summary distance value for the query point by combining the weighted distance values between the query point and each of the clusters using the outlier detection module; and
    (f) determining if the query point is an outlier based upon the summary distance value using the outlier detection module.

2. The method of claim 1, further comprising determining a weighted average deviation of each of the plurality of parameters of the query point.

3. The method of claim 1, further comprising acquiring sensor readings from a plurality of sensors and forming values for the query point based upon the sensor readings.

4. The method of claim 3, further comprising forming values for the query point from sensor readings taken over time.

5. The method of claim 1, further comprising removing the query point from training data if the query point is an outlier.

6. The method of claim 1, further comprising normalizing the summary distance value and displaying the normalized summary distance value on a display.

7. The method of claim 1, wherein step (c) further comprises determining the group of closest clusters to the query point from the plurality of clusters such that a sum of a number of training points in the group of closest clusters equals or exceeds a predetermined value.

8. The method of claim 7, further comprising adding a cluster to the group of closest clusters whose distance from the query point is closer than a cluster in the group of closest clusters.

9. The method of claim 8, further comprising removing a cluster from the group of closest clusters whose distance is further from the query point than a cluster added to the group of closest clusters.

10. A system for detecting an anomaly in a behavior of a system, comprising:
    a processor;
    a memory coupled to the processor;
    a plurality of input and output devices coupled to the processor, the plurality of devices including a plurality of sensors, and
    a data storage coupled to the processor having cluster modeling data for a plurality of clusters stored therein, the cluster modeling data comprising a number of training points in each of the plurality of clusters;
    the memory having stored therein a set of instructions, that when executed by the processor, cause the processor to perform the operations of:
    receive a query point comprising a plurality of parameters including training data provided by the plurality of sensors in real-time or near real-time, wherein the sensors provide sensor data, wherein the sensor data including at least one of pressure data, flow data, position data, acceleration data, velocity data and temperature data, wherein the sensor data utilized to form the query point;
    generate a group of closest clusters that is closest to the query point from the plurality of clusters,
    determine if the group of the closest cluster is satisfied a threshold value; wherein the threshold value is a user-defined value;
    determine a weighted distance value between the query point and each of the clusters in the group of closest clusters,
    wherein the weighted distance value, WDV, between the query point and each cluster in the group of closest clusters is determined by:

$$WDV = nd$$

where n is the number of the training points in a cluster and d is the distance between the cluster and the query point,
    generating a summary distance value for the query point by combining the weighted distance values between the query point and each of the clusters using the outlier detection module, and
    determine if the query point is an outlier based upon the summary distance value.

11. The system of claim 10, wherein the parameters of the query point are determined from the sensor data.

12. The system of claim 10, wherein the set of instructions, that when executed by the processor, are further operable to cause the processor to determine a weighted average deviation of each parameter of the query point.

13. The system of claim 10, wherein the set of instructions, that when executed by the processor, are further operable to cause the processor to normalize the summary distance value.

14. The system of claim 10, wherein the set of instructions, that when executed by the processor, are further operable to cause the processor to determine the group of closest clusters to the query point from the plurality of clusters such that a sum of the number of training points in the group of closest clusters equals or exceeds a predetermined value.

15. The system of claim 14, wherein the set of instructions, that when executed by the processor, are further operable to cause the processor to add a cluster to the group of closest clusters whose distance from the query point is closer than a cluster in the group of closest clusters.

16. The system of claim 15, wherein the set of instructions, that when executed by the processor, are further operable to cause the processor to replace a cluster in the group of closest clusters with a cluster whose distance from the query point is closer than the replaced cluster.

17. The system of claim 10, wherein the cluster modeling data for the plurality of clusters further comprises a distance value for each cluster from an indexing reference point.

18. The system of claim 17, wherein the set of instructions, that when executed by the processor, are further operable to cause the processor to determine a distance between the query point and the indexing reference point.

\* \* \* \* \*